US008369052B2

(12) United States Patent
McCoy et al.

(10) Patent No.: US 8,369,052 B2
(45) Date of Patent: Feb. 5, 2013

(54) MODULAR CIRCUIT BREAKER

(75) Inventors: Brian Timothy McCoy, Lawrenceville, GA (US); Russell T. Watford, Lawrenceville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 329 days.

(21) Appl. No.: 12/507,415

(22) Filed: Jul. 22, 2009

(65) Prior Publication Data

US 2010/0020453 A1 Jan. 28, 2010

Related U.S. Application Data

(60) Provisional application No. 61/083,722, filed on Jul. 25, 2008, provisional application No. 61/084,074, filed on Jul. 28, 2008.

(51) Int. Cl.
*H02H 3/00* (2006.01)

(52) U.S. Cl. .......................................... 361/42; 361/115

(58) Field of Classification Search .............. 361/42–50, 361/102, 115, 728, 730, 729, 652; 335/18, 335/132, 202, 207; 200/50.32–50.4, 331, 200/332

See application file for complete search history.

(56) References Cited

U.S. PATENT DOCUMENTS

| | | | | |
|---|---|---|---|---|
| 4,731,921 | A * | 3/1988 | Ciarcia et al. | 29/622 |
| 5,686,709 | A * | 11/1997 | Casagrande et al. | 200/50.32 |
| 5,847,913 | A * | 12/1998 | Turner et al. | 361/93.1 |
| 6,052,046 | A * | 4/2000 | Ennis et al. | 335/202 |
| 6,239,962 | B1 * | 5/2001 | Seymour et al. | 361/115 |
| 6,545,574 | B1 * | 4/2003 | Seymour et al. | 335/18 |
| 7,566,841 | B2 * | 7/2009 | McCoy | 200/331 |
| 7,795,550 | B2 * | 9/2010 | McCoy | 200/50.32 |
| 7,911,298 | B2 * | 3/2011 | Carlino et al. | 335/18 |
| 2003/0110620 | A1 * | 6/2003 | Seymour et al. | 29/830 |
| 2004/0252421 | A1 * | 12/2004 | Knox et al. | 361/23 |
| 2009/0188893 | A1 * | 7/2009 | Titus | 218/149 |

* cited by examiner

*Primary Examiner* — Ronald W Leja

(57) ABSTRACT

The present invention relates generally to a circuit breaker. More particularly, the invention encompasses a modular circuit breaker. The present invention is also directed to a novel a modular circuit breaker with a trip bar. The inventive two pole residential circuit breaker includes an Arc Fault and Ground Fault electronic detection system. The modular breaker design includes an electronic system used for tripping a designated mechanism pole which in turn trips the secondary mechanism pole. Electronic components are included that sense the continuous current flow through each mechanism pole simultaneously to determine when a trip event is needed. The electronic system of this invention includes a self diagnostic system with electronic visual indicators that display the method of which trip condition occurred.

11 Claims, 12 Drawing Sheets

MODULAR CIRCUIT BREAKER

This application claims priority under 35 U.S.C. §119 to U.S. Provisional Patent Application Ser. No. 61/083,722, filed on Jul. 25, 2008, titled “Modular Circuit Breaker,” assigned to the same assignee as the present invention, and incorporated herein by reference in its entirety.

This application claims priority under 35 U.S.C. §119 to U.S. Provisional Patent Application Ser. No. 61/084,074, filed on Jul. 28, 2008, titled “Modular Circuit Breaker And Trip Bar,” assigned to the same assignee as the present invention, and incorporated herein by reference in its entirety.

BACKGROUND OF THE INVENTION

1. Field of the Invention

The present invention relates generally to an electrical power circuit breaker. More particularly, the invention encompasses an electrical power modular circuit breaker. Even more particularly, the invention relates to electrical power circuit breakers that integrate overload, arc fault, and ground fault detection and interruption.

2. Description of Related Art

U.S. Pat. No. 4,641,217 (Robert A. Morris, et al.), describes a two pole ground fault circuit breaker is provided by the attachment of a power supply module and a second single pole circuit breaker module to a completely assembled single pole ground fault circuit breaker. Electrical interconnection between the signal processor circuit within the single pole ground fault circuit breaker module and the second pole is made by a first pair of conductors. Interconnection between the power supply module and the single pole within the ground fault circuit breaker is provided by a separate pair of conductors.

U.S. Pat. No. 5,321,574 (John R. Patrick, et al.) illustrates a circuit breaker/surge arrestor package for plug-in installation in the space of two standard one-inch openings in a contemporary residential load center. The electrical and thermal characteristics of the components are selected such that a threshold of a substantially continuous current through a Metal Oxide Varistor in the surge arrestor causes the circuit breaker to trip magnetically before being able to trip thermally.

U.S. Pat. No. 5,483,211 (Melvin A. Carrodus, et al.) describes a miniature circuit breaker with two thermal-magnetic poles has an electronic trip device providing ground fault, and sputtering arc fault (if desired), protection located entirely in a large central compartment of a molded housing between compartments housing the two mechanical poles. The molded housing is assembled from a top base and top cover forming a compartment for the thermal-magnetic trip device of the first pole, and a bottom cover and a bottom base forming the compartment for the second mechanical pole. A hollow center piece mates with the top and bottom bases to form the single, large electronics compartment.

Examples of a two pole ground fault circuit breaker are provided in U.S. Pat. Nos. 5,483,211 (211 patent) and 4,641,217 (217 patent). These breakers include common mechanism that include thermal and magnetic components to provide overload and instantaneous trip functions that protect circuits. Insulated molded housings are used to enclose and separate the mechanism poles from the electrical components. Electronic ground fault detection is included in these circuit breakers. The overall breaker size is standard so that they plug or bolt into two adjacent positions of a load center or panel board.

The molded housings for the two pole ground fault circuit breaker for ’217 patent are basically two molded housings for each thermal/magnetic mechanism. The molded housing includes an open compartment. The bottom open compartment is for the mechanism while the other upper open compartment is for part of the electrical components for ground fault detection. When the mechanism poles are assembled, the two upper open compartments come together to form a compartment containing the electronics for the ground fault detection sandwiched between the two mechanism poles. For the ’211 patent, the molded housings are basically two molded housings for each thermal/magnetic mechanism. Each bottom mold contains an open compartment for the mechanism. For one mechanism, an upper housing encloses the mechanism and provides another open compartment, opposite side of the housing, for part of the ground fault electronics. A separate open molded housing, containing the outside dimensions as the mechanism molded housings except with no inner wall, is used to form the remaining compartment for the electronics. When the mechanism poles are assembled with the open molded housing, a compartment is formed containing the electronics for the ground fault detection sandwiched between the two mechanism poles.

Both the ’211 and the ’217 patents include electronics for ground fault by providing neutral to ground and line to ground fault detection. These circuits require a double wound solenoid located in the electronic compartment between the two thermal/magnetic mechanical poles.

The splitting of the electronic compartment as described in both ’211 and ’217 patents requires additional assembly effort with loose parts. This complicates assembling of the two pole circuit breakers at final assembly. In the ’217 and ’211 patents, the electronics enclosed in the center compartment includes ground fault detection only.

SUMMARY OF THE INVENTION

An object of this invention is to provide a modular circuit breaker package.

Another object of this invention is to provide a modular circuit breaker with a trip bar.

Further another object of this invention is to provide a two pole residential circuit breaker that includes an Arc Fault and Ground Fault electronic detection and interruption circuit.

To accomplish at least one of these objects, a modular circuit breaker includes two thermal-magnetic electrical circuit breaker modules and an arc fault and ground fault combined detector/interrupter module. Each electrical circuit breaker module includes a top cover and a bottom cover to form a first and second electrical breaker mechanism enclosure. The mechanism poles for the circuit breakers are affixed to the bottom cover and the top cover is secured to the bottom cover with one fastener for each module. The arc fault and ground fault combined detector/interrupter module, similarly, has a top cover and a bottom cover to form an arc fault/ground fault electronics enclosure. The top cover and the bottom cover provide supporting features for the arc fault and ground fault combined detector/interrupter electronic circuitry. The arc fault and ground fault combined detector/interrupter electronic circuitry detects the existence of arc faults and ground faults and generates electronic signals for tripping a primary mechanism pole which in turn trips a secondary mechanism pole. The arc fault and ground fault combined detector/interrupter electronic circuitry senses the continuous current flow through each mechanism pole simultaneously to determine when a trip event is needed. The arc fault and ground fault combined detector/interrupter electronic circuitry of this invention includes a self diagnostic system with electronic visual indicators that displays the method of which a trip condition occurred.

The primary and secondary electrical breaker mechanism enclosures are aligned and in contact with the arc fault and ground fault electronics enclosure situated between them. If the primary breaker mechanism module or the secondary breaker mechanism module or the arc fault and ground fault combined detector/interrupter circuit module are damaged or fail, it can be replaced and the remaining primary breaker mechanism module or the secondary breaker mechanism module or the arc fault and ground fault combined detector/interrupter circuit module are reusable.

The modular circuit breaker has a trip bar placed such that a trip event from a primary thermal-magnetic electrical circuit breaker module trips a secondary thermal-magnetic electrical circuit breaker module. Furthermore the trip bar is activated such that detection of an arc fault or a ground fault by the arc fault and ground fault combined detector/interrupter electronic circuitry cause a trip event within a designated primary thermal-magnetic electrical circuit breaker module and a secondary thermal-magnetic electrical breaker module.

In other embodiments, a trip bar within an electrical circuit breaker has a first interface pad, a second interface pad, a first pivot post and a second pivot post. The electrical circuit breaker includes two thermal-mechanical electrical circuit breaker modules and an arc fault and ground fault combined detector/interrupter circuit module. The first interface pad has an armature bearing surface that is in contact with a first armature and a cradle bearing surface that is in contact with a first cradle of a first of the two thermal-mechanical electrical circuit breaker modules. Similarly, the second interface pad has a second armature bearing surface that is in contact with a second armature and a second cradle bearing surface that is in contact with a second cradle of a second of the two thermal-mechanical electrical circuit breaker modules. The first pivot post is in contact with an inner surface of a cover of the arc fault and ground fault combined detector/interrupter circuit module. The second pivot post is in contact with an inner surface of a cover of the second thermal-mechanical electrical circuit breaker module.

During a fault, one of the two thermal-mechanical electrical circuit breaker modules can trip causing the trip bar to rotate and trip the other of the two thermal-mechanical electrical circuit breaker modules. The arc fault and ground fault combined detector/interrupter circuit module contains a solenoid which when activated can extend a plunger which causes one of the two thermal-mechanical electrical circuit breaker modules to trip. In turn, the one thermal-mechanical electrical circuit breaker module causes rotation of the trip bar causing the other of the two thermal-mechanical electrical circuit breaker modules to trip.

In some embodiments, the trip bar further includes an armature bearing surface. The armature bearing surface is impacted with a plunger from a solenoid of the arc fault and ground fault combined detector/interrupter module when an arc fault or ground fault is detected. The armature impacting the plunger bearing surface causes the trip bar to rotate, thus causing the two thermal-mechanical electrical circuit breaker modules to trip.

The trip bar extends from the first thermal-mechanical circuit breaker module, through the arc fault and ground fault combined detector/interrupter circuit module and into the second thermal-mechanical circuit breaker module. The first interface pad has a first armature bearing surface that is aligned to contact the armature of the first thermal-mechanical electrical circuit breaker modules. The first interface pad has a cradle bearing surface that is aligned to contact the cradle of the first thermal-mechanical electrical circuit breaker module. The second interface pad has a second armature bearing surface that is aligned to contact the armature of the second thermal-mechanical electrical circuit breaker modules. The second interface pad has a cradle bearing surface that is aligned to contact the cradle of the second thermal-mechanical electrical circuit breaker module. The first pivot post is in contact with the inner surface of the cover of the arc fault and ground fault combined detector/interrupter circuit module and the second pivot post is in contact with the inner surface of the cover of the second thermal-mechanical electrical circuit breaker module.

In other embodiments, a modular circuit breaker package has a first thermal-mechanical electrical circuit breaker enclosure, a second thermal-mechanical electrical circuit breaker enclosure, and an arc fault and ground fault detector/interrupter circuit enclosure. A first breaker mechanism pole is mounted in the first thermal-mechanical electrical circuit breaker enclosure. The first thermal-mechanical electrical circuit breaker enclosure has a first side cover for receiving the breaker mechanism pole and a second side cover for protecting the first breaker mechanism pole. The second side cover of the first thermal-mechanical electrical circuit breaker enclosure has an opening to receive a first interface pad of a trip bar to align the first interface pad with an armature of the first breaker mechanism pole.

A second breaker mechanism pole is mounted in the second thermal-mechanical electrical circuit breaker enclosure. The second thermal-mechanical electrical circuit breaker enclosure has a first side cover for receiving the breaker mechanism pole and a second side cover for protecting the second breaker mechanism pole. The first side cover of the second thermal-mechanical electrical circuit breaker enclosure has an opening to receive a second interface pad of the trip bar to align the second interface pad with an armature of the second breaker mechanism pole and has a bearing surface to receive a second pivot post of the trip bar for securing the trip bar and allowing the trip bar to rotate.

An arc fault and ground fault combined detector/interrupter circuit is mounted in the arc fault and ground fault detector/interrupter circuit enclosure. The arc fault and ground fault detector/interrupter enclosure has a first side cover for receiving the arc fault and ground fault combined detector/interrupter circuit and a second side cover for protecting the arc fault and ground fault combined detector/interrupter circuit. The first and second side cover of the arc fault and ground fault detector/interrupter enclosures have openings through which the trip bar passes. The second side cover of the arc fault and ground fault detector/interrupter enclosure has a bearing surface to receive a first pivot post of the trip bar for securing the trip bar and allowing the trip bar to rotate.

The first and second thermal-mechanical electrical circuit breaker enclosure are aligned and in contact with the arc fault and ground fault detector/interrupter circuit enclosure situated between them. If the primary breaker mechanism module or the secondary breaker mechanism module or the arc fault and ground fault combined detector/interrupter circuit module are damaged or fail, it can be replaced and the remaining primary breaker mechanism module or the secondary breaker mechanism module or the arc fault and ground fault combined detector/interrupter circuit module are reusable.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

DETAILED DESCRIPTION OF THE INVENTION

Figure 1A:
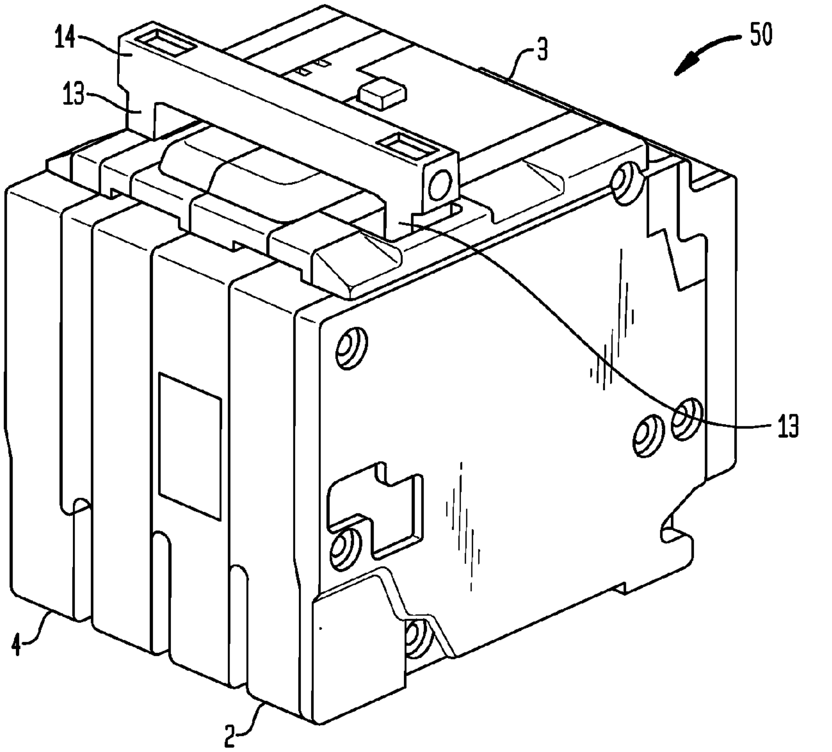
FIGS. 1A and 1B illustrate isometric front views of the two pole arc fault combo and ground fault residential circuit breaker in accordance with the invention.

In some embodiments, a modular circuit breaker uses a common two pole thermal/mechanical breaker mechanism that includes an arc fault and ground fault combined detector/interrupter circuit that continuously monitors the current flowing in each mechanism pole. An electrical/mechanical trip event occurs if the arc fault and ground fault combined detector/interrupter circuit detects an arc fault or ground fault condition. Toroids are used to sense arc or ground fault conditions. In other embodiments, an alternate method to sense arc fault detection would be to use straps on the load end of the breaker. The arc fault and ground fault combined detector/interrupter circuit includes a single wound solenoid that, when activated by an arc fault or ground fault in either of the two mechanism poles, trips a designated mechanism pole. As the designated breaker mechanism pole unlatches, a common trip bar extends through the electronics to the secondary breaker mechanism pole for tripping.

In other embodiments, the arc fault and ground fault combined detector/interrupter circuit simultaneously trips the breaker mechanisms. When the single wound solenoid activates, the common trip bar trips the breaker mechanism poles of the thermal-mechanical breaker mechanisms.

When adding electrical components to a small residential breaker design, several areas of concern will arise. One concern will be related to the physical space needed for the electrical components needed for sensing the arc and ground fault detection. For arc fault detection, a current sensing toroid is needed in the mechanism pole. Toroids and sensing wires could tap into the line or load side of the current flow through the mechanism. To save on space, an alternative sensing method would be to use straps on the load end which are thin pieces of metal with a known resistance. In this case, the sensing wires for straps would need to be toward the load end of the breaker. For ground fault detection, a toroid is needed for each mechanism pole and typically has three wires through the center. In addition, a differential (toroid) is needed. The size of the toroid requires three wires going through the center, two lines and one neutral. Three wires, two lines and one neutral, are required to go through the differential.

Breaker mechanism poles are typically capable of withstanding high surge currents. This requires that electrical components used for arc and ground fault detection be assembled in a separate compartment for protection. The second area of concern will be related to the assembly process of electronics in a manufacturing environment. Due to typical manufacturing assembly processes of the prior art, electrical connections, welds and/or crimps, may not be up to quality standards to survive high surge currents. In addition, a common final assembly of the prior art involves a stack up type assembly method. This means that each mold needs to be stacked in order to complete each compartment for the mechanism and electronic compartments for the circuit breakers of the prior art. The flaw with the assembly method of the prior art is that any one component or module could result in a bad unit. This invention addresses this with a modular design wherein each compartment enclosure is separate from the other. Each mechanical or electronic pole module are held together with a single fastener such as one rivet. Each compartment is calibrated and/or checked prior to the final assembly. At final assembly, if a module is damaged or fails testing, only that module is replaced and the assembly completed. The mechanism poles can be assembled in a typical manufacturing environment while the electronic compartment can be assembled in a cleaner more controlled environment. The final assembly involves stacking of the individual modules, not individual walls, and riveting the three separate modules together.

Figure 1B:
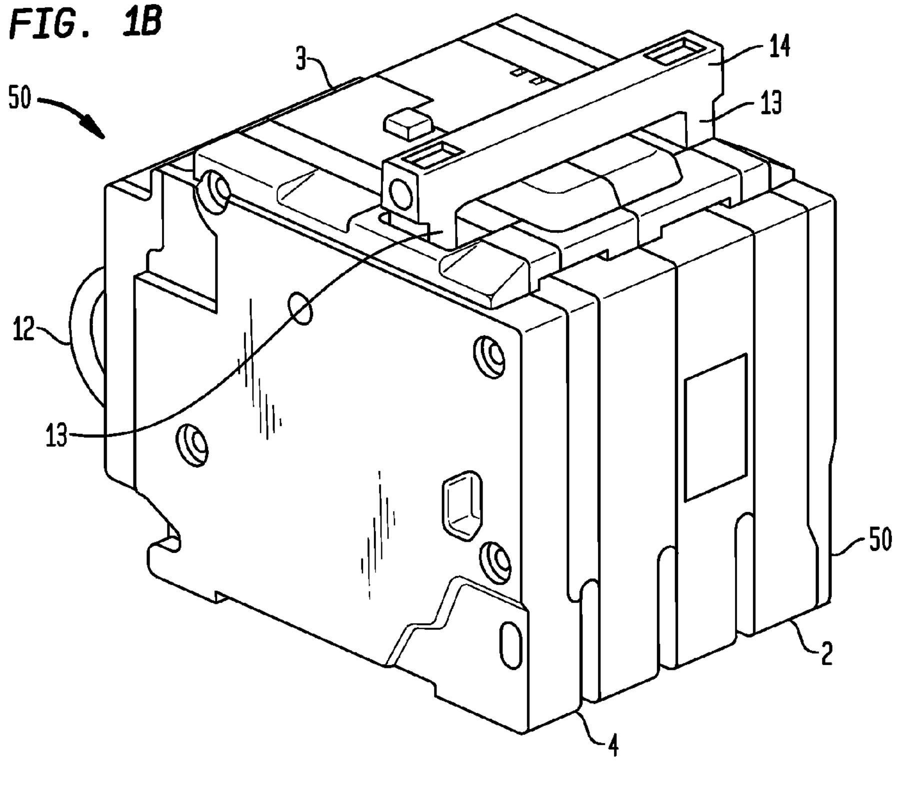
Figure 2:
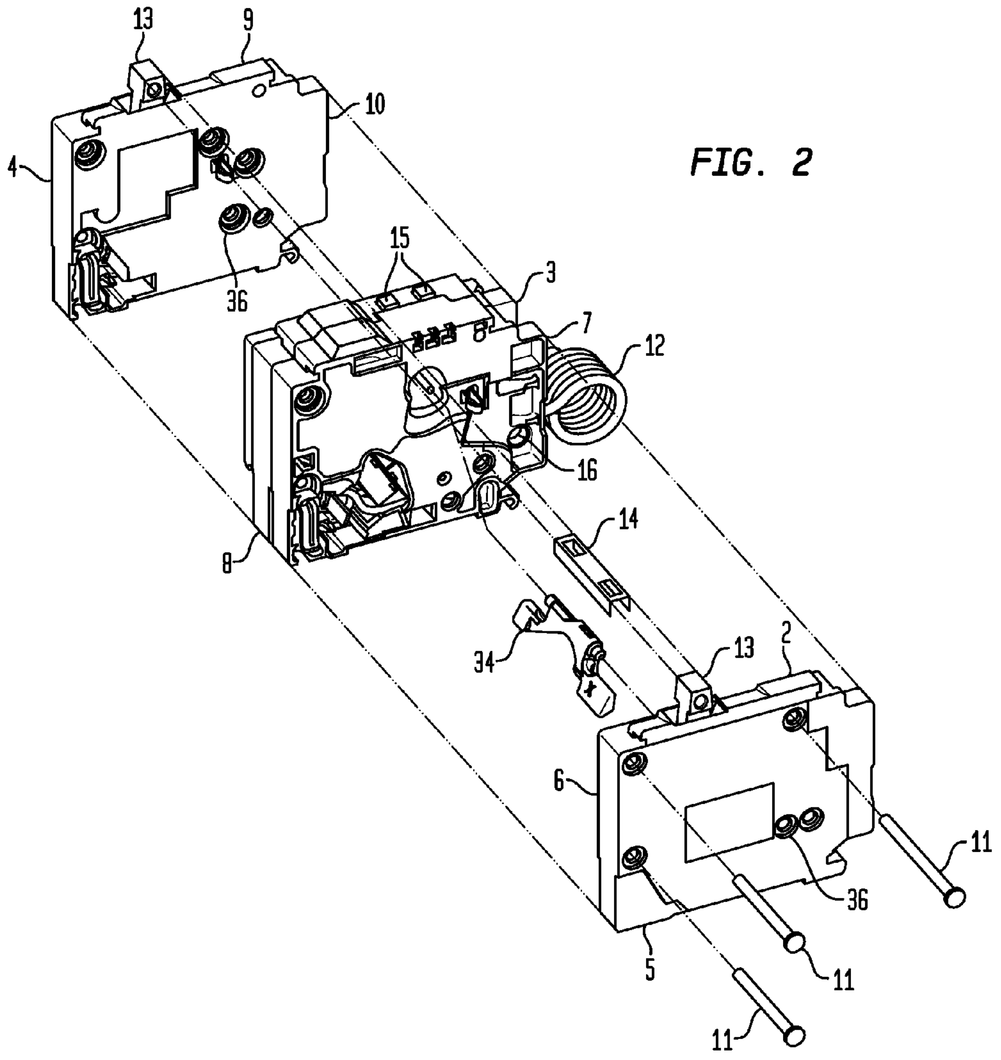
FIG. 2 is a detailed isometric exploded view of the embodiment shown in FIG. 1.

Referring to FIGS. 1A, 1B and 2 a two pole arc fault and ground fault circuit breaker 50 in accordance with the invention includes three modules. One left module 2, the center module 3, and the right module 4. Each module 2, 3, and 4 is made up of two molded halves that are made of a thermal setting resin material with electrical insulating properties. The left module 2 is made up an outer top cover 5 and an inner bottom cover 6. The center module 3 is made up an outer top cover 7 and an inner bottom cover 8. The right module 4 is made up an inner top cover 10 and an outer bottom cover 9. The mechanical modules are held together with two rivets 36 whereas the electronic module is held together with one rivet or in some embodiments a plastic latching mechanism. At final assembly, all three modules are held together with long rivets 11 and interlocking features. The pigtail 12 connects to the neutral conductor in the circuit breaker to a load center or panel board neutral bar (not shown). Each mechanical pole has a handle 13 that can be operated simultaneously with a handle tie bar 14. In addition, the arc fault and ground fault circuitry can be tested with a push to test button 15. The long rivets are used for final assembly. The short rivets 36 are used to assemble the outer mechanism poles 2 and 4 prior to final assembly. Similarly, in FIG. 2 the one rivet 16 used to assemble the center electronics pole 3 prior to final assembly. In some embodiments, a fastener such as a plastic latching mechanism may be used to assemble the center electronics pole 3. The modules 2, 3, and 4 are interlocked to the other during final assembly by the protrusions (not shown) and cavities (not shown) located on the outside of each module housing.

Figure 3A:
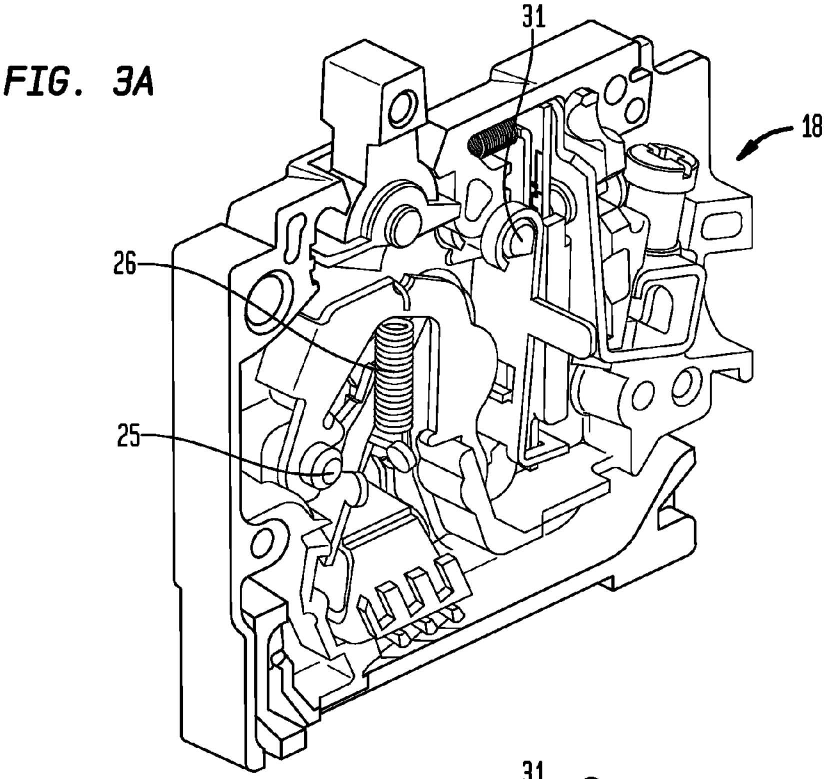
FIGS. 3A and 3B are detailed isometric views of the left and right breaker mechanism poles of the embodiment shown in FIGS. 1A and 1B.
Figure 3B:
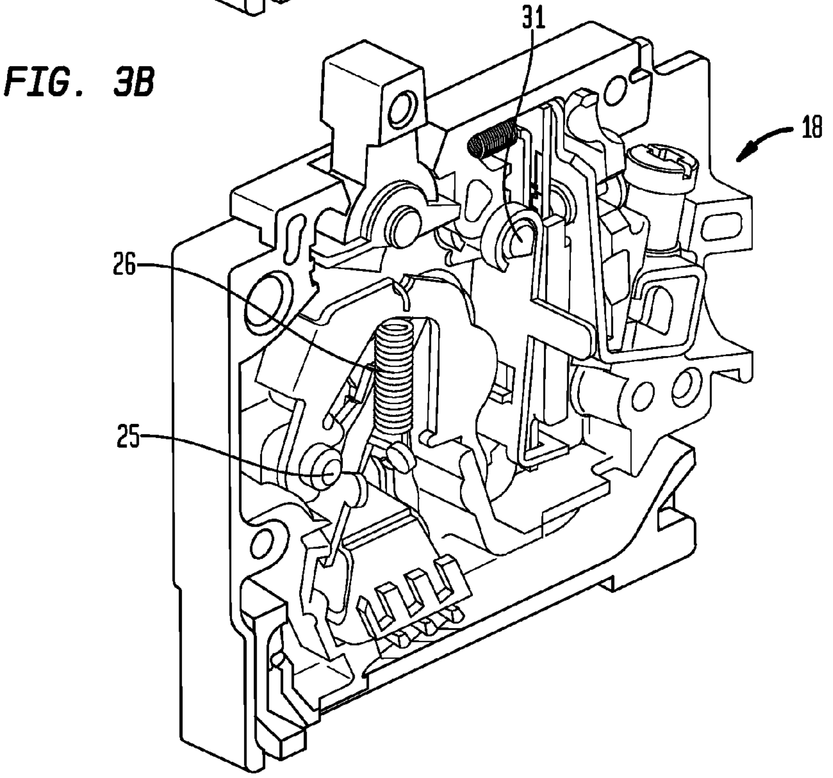
Figure 4:
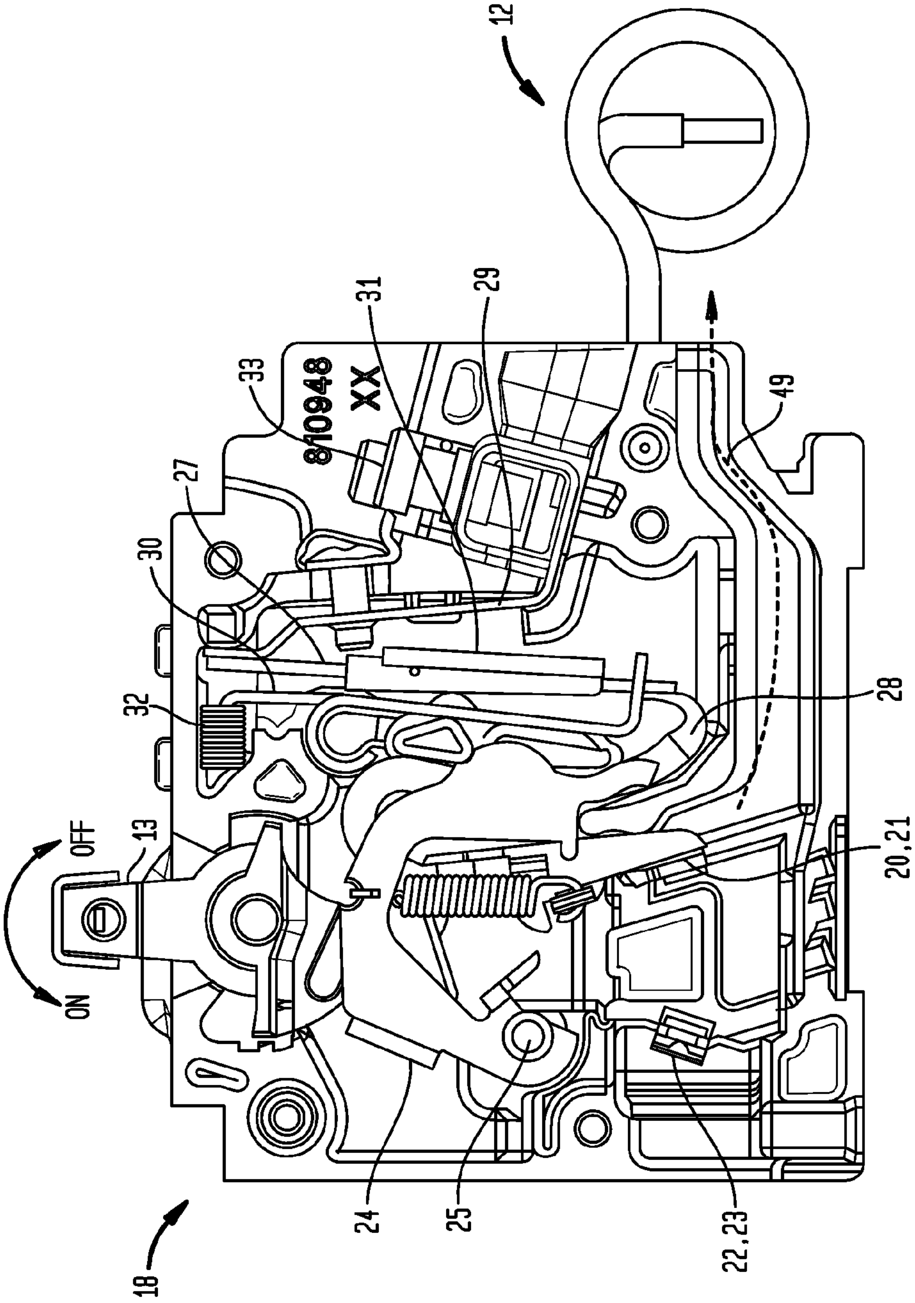
FIG. 4 is an orthographic view of a typical breaker mechanism pole of the embodiment of FIGS. 1A and 1B, and where several components of the assembly have been removed for ease of understanding.

FIGS. 3A and 3B illustrates the left and right modules 2 and 4 with the top covers 5 and 10 removed to show the internal features that support the mechanical breaker mechanism. Referring now to FIGS. 3A, 3B, and 4, each breaker mechanism 18 and 19 is located in the bottom covers 6 and 9 respectively. The mechanical poles are similar to those found in U.S. Pat. No. 5,321,574 and will therefore be described in general within this invention. Each breaker mechanism 18 and 19 has a set of moveable contacts 20 connected to a moveable bus 21 and stationary contacts 22 connected to a stationary bus 23. The breaker mechanism poles 18 and 19 also include an overload and instantaneous operation mechanism. A short circuit gas channel 49, is shown in FIG. 4.

The operating device includes a moveable bus 21 carrying a moveable contact 20 including a cradle 24 that pivots about a molded feature 25 in the bottom covers 6 and 9 respectively. The cradle 24 is connected to the moveable bus 21 by an extension spring 26. The upper end of the moveable bus 21 is connected to the breaker handle 13. To close the contacts, the handle 13 is moved to the on position which rotates the moveable bus 21. To open the contacts 20 and 22, the handle 13 is moved to the off position. This action rotates the moveable bus 21 and then separates the contacts 20 and 22 respectively.

The moveable bus 21 is connected to the bi-metal 27 by a flexible conductor 28. The bi-metal 27 is part of the overload 30 and instantaneous 31 tripping functions of the mechanism 18 and 19 respectively. The top end of the bi-metal 27 is connected to the load terminal 29 and is captured by molded features in the bottom covers 6 and 9 respectively. The overload trip function includes a bi-metal 27, an armature 30 that pivots on a molded feature 31 located in the bottom covers 6 and 9, and a feature located on the cradle 24. The latch system of the circuit breaker activates when the handle 13 is moved past the off position. As the handle 13 is rotated toward the off position, the cradle 24 rotates counterclockwise, toward the handle. The tip of the cradle 24 passes the latch feature on the armature 30. The armature 30 rotates clockwise toward the cradle 24 by a compression spring 32 pushing on the top of the armature 30 above the armature pivot feature 31 located in the bottom covers 6 and 9.

During an overload condition, the bi-metal 27 is heated up from the current flowing through the breaker and rotates counterclockwise toward the load lug 33. The armature 30 has a feature that pulls the armature 30 as the bimetal 27 is deflected. This rotation decreases the cradle 24 to armature 30 latch surfaces. When the surface becomes too small to maintain, the extension spring rotates the moveable bus 21 counterclockwise to separate the moveable contact 20 from the stationary contact 22.

Figure 3C:
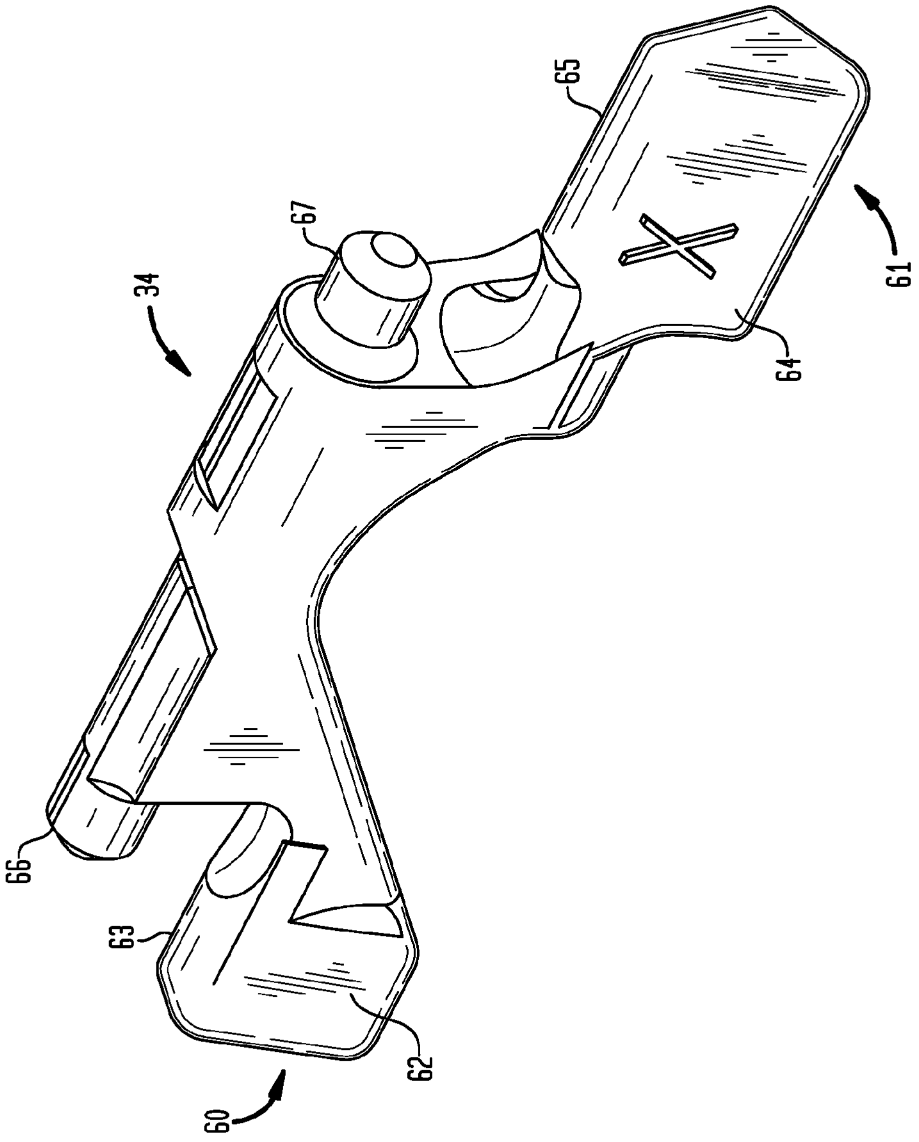
FIG. 3C is a detailed isometric view of the trip bar of the embodiment shown in FIG. 2.

Refer now to FIG. 3*c* for description of the trip bar 34. As shown in FIG. 1, the trip bar 34 extends from left module 2, through the center module 3, and into the right module 4. The trip bar 34 is used to ensure that the two mechanical poles 18 and 19 have been tripped. As shown in FIG. 1, the trip bar 34 extends from left module 2, through the center module 3, and into the right module 4. Each end of the trip bar 34 has an actuating feature 60 and 61. Each actuating feature 60 and 61 has an armature bearing surface 63 and 65 that interfaces with the armatures 30 in each mechanism pole, 18 and 19. When one mechanical pole, 18 or 19, trips independent of an arc or ground fault, the cradle 24 from that mechanism rotates in a clockwise direction. A profile feature on the cradle 24 interfaces with a cradle bearing surface cradle bearing surface 62 and 64 of the actuation feature 60 and 61 of the trip bar 34. This forces the trip bar 34 to rotate in a counterclockwise direction. In the other mechanism pole, the actuation feature 60 and 61 begins to rotate counterclockwise and rotates the armature 30 counterclockwise which in turn unlatches the cradle 24 and thus causing the other mechanical pole to trip.

Figure 5A:
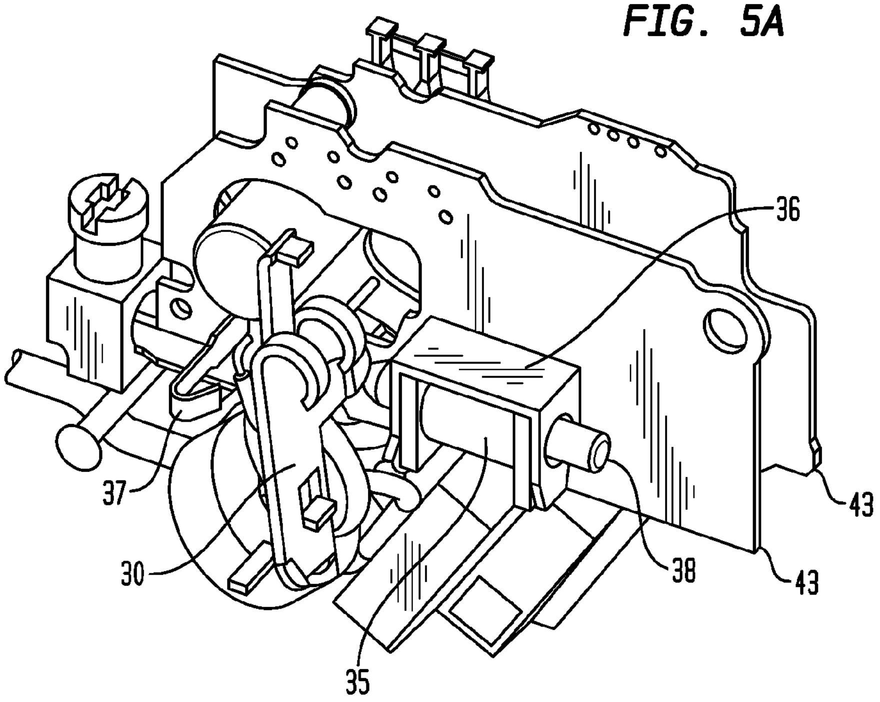
FIGS. 5A and 5B are isometric views of the circuit board and related components of the electronic components of an embodiment of the modular circuit breaker.
Figure 5B:
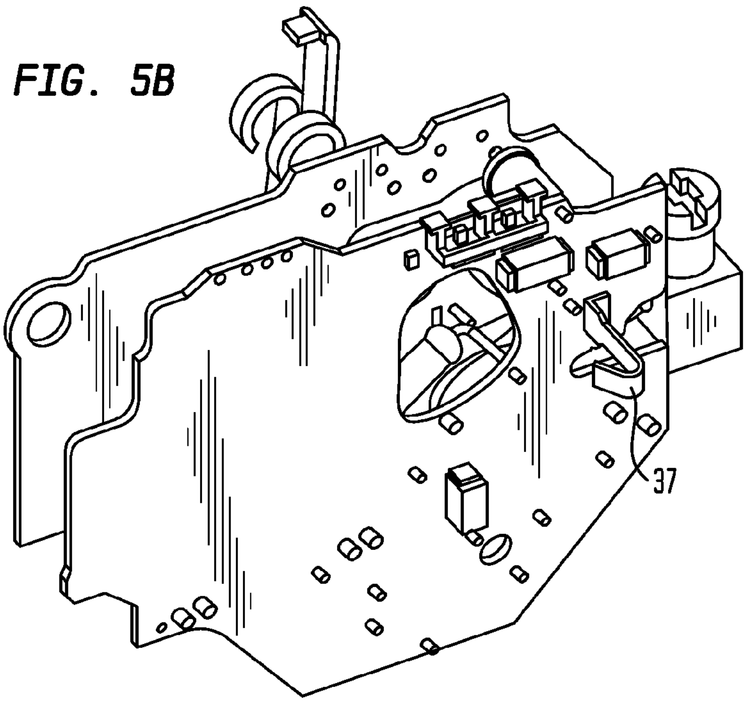

FIGS. 5A and 5B illustrates the electronic module 17 showing the electronic trip circuitry including the arc fault and ground fault detection circuitry and the interruption circuits that when activated causes each breaker pole mechanism 18 and 19 to trip thus interrupting the electrical service from the load. FIGS. 6A, 6B, 6C, 6D, and 6E show the electronic module 17 and the mechanical pole mechanism 18. Referring to FIGS. 5A, 5B, 6A, 6B, 6C, 6D and 6E, the electronic trip circuitry of this invention within the electronic module 17 includes a single wound solenoid 35 mounted on a circuit board 43 and is located in the center module. A connector 37 is used to tap into the current flow through the mechanism poles on the load terminal 29 of FIG. 4 and in turn supplies power to the circuit board 43. A feature located on the armature 30 of FIG. 4 from a predetermined mechanical pole extends into the electronic module. The solenoid armature has a molded insulated piece 36 attached to the tip. When the single wound solenoid is energized, the solenoid armature 38 extends, impacts an armature bearing surface, and rotates the armature 30 in a counterclockwise direction and unlatches the cradle 24. As the cradle 24 rotates in a clockwise direction, the cradle rotates the trip bar 34 in a counterclockwise direction. The actuating member located on the opposite end of the trip bar 34 has an armature bearing surface that interfaces and rotates the armature 30 in a counterclockwise direction in the other mechanical pole. The rotation of the trip bar 34 results in unlatching the cradle 24 in the other mechanical pole. The solenoid is energized from an arc fault when a differential sensor 42 (also known as ground to line or ground fault toroid) senses a difference between the two arc fault toroids 39 and 40. Each arc fault toroid 39 and 40 monitors the current flowing through each mechanism pole 18 and 19 respectively. A differential sensor 42 determines if there is a difference and sends a signal to activate the solenoid. Note: for arc fault detection, the sensing wires can be mounted to the line or load side of the mechanical poles. In this invention, the sensing wires are connected to the line side of the breaker. When the solenoid is energized, the solenoid armature 38 is extended and interfaces with the armature 30 of a designated mechanical pole. When the breaker has broken the current flow, power is no longer supplied to the circuit board.

Figure 6A:
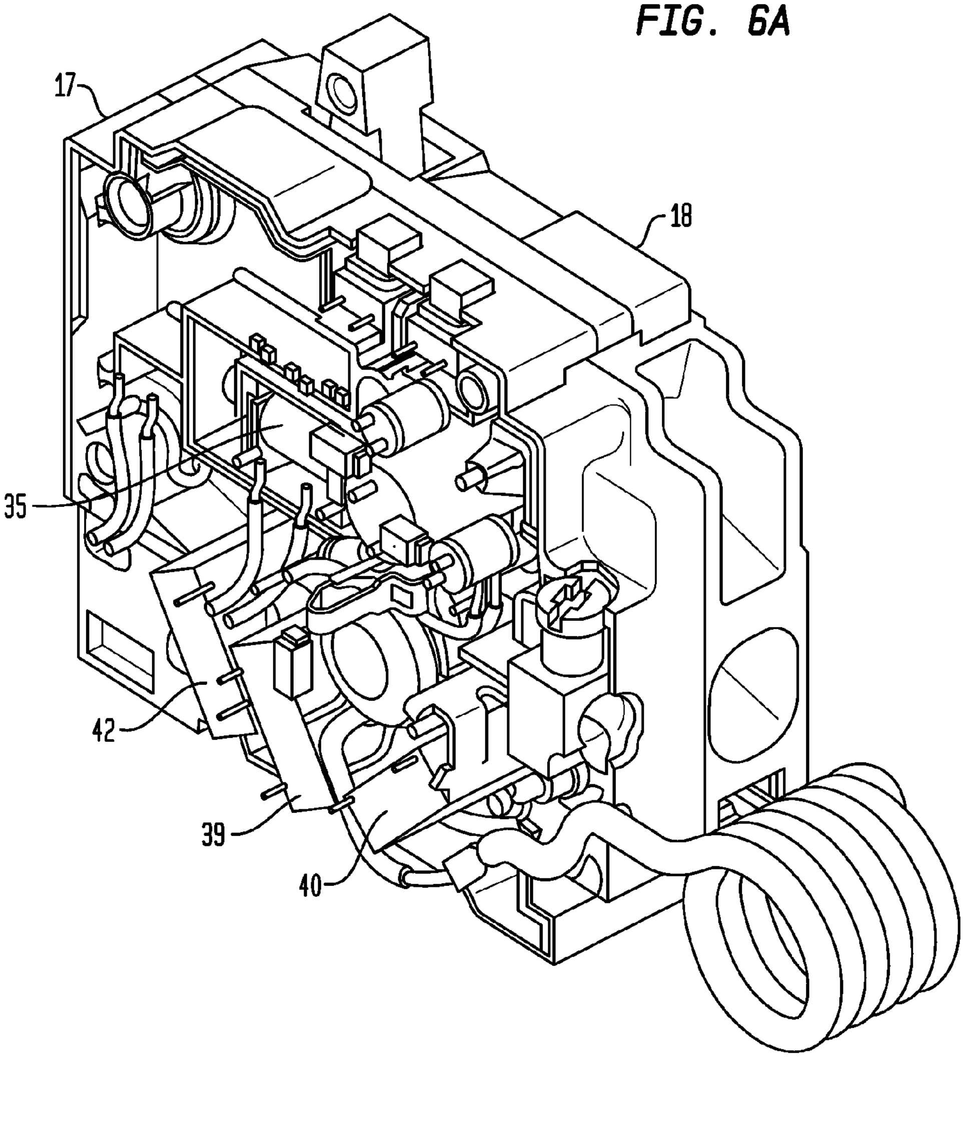
FIGS. 6A, 6B, 6C, 6D and 6E are detailed isometric views of the electro/mechanical tripping mechanism at different stages of assembly.
Figure 6B:
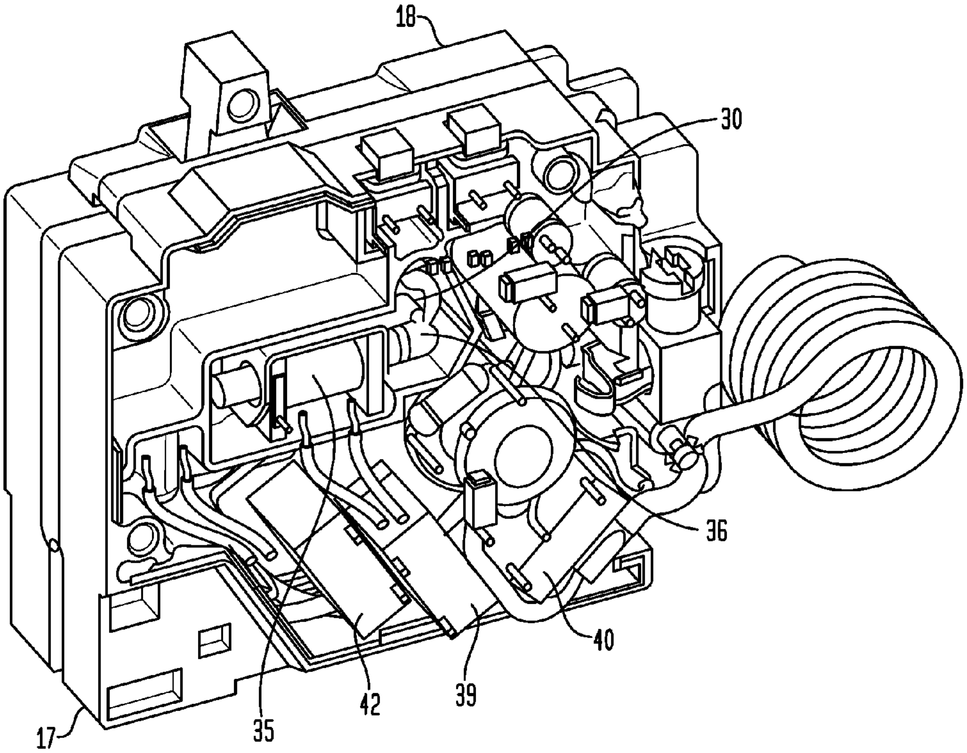
Figure 6C:
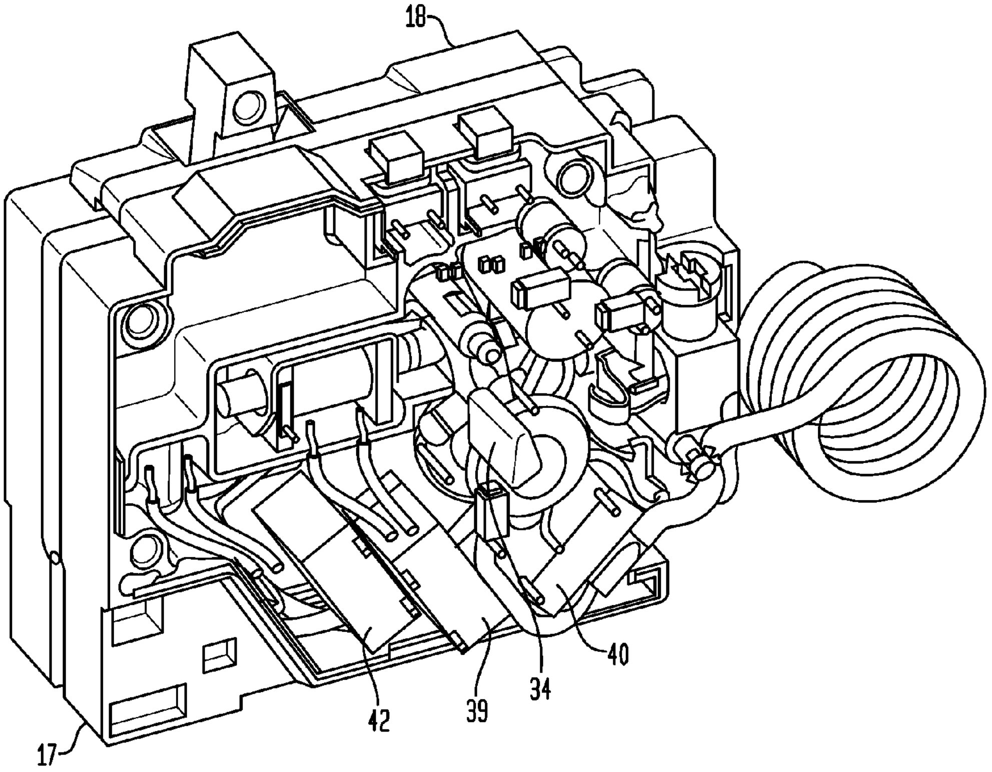
Figure 6D:
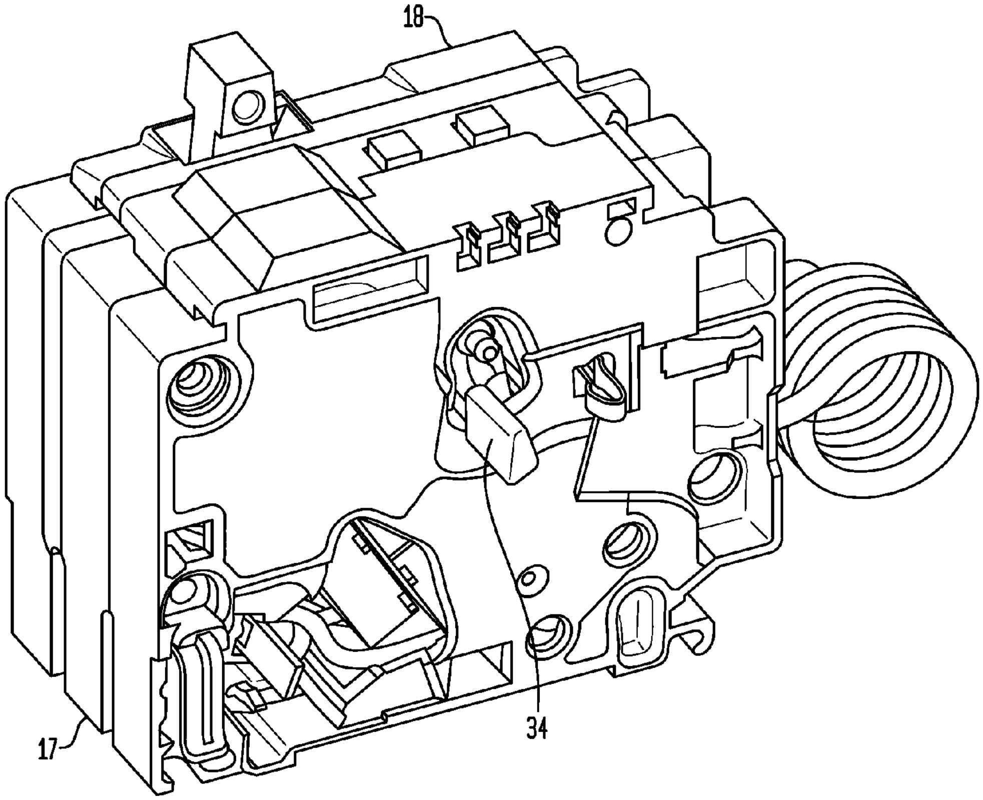
Figure 6E:
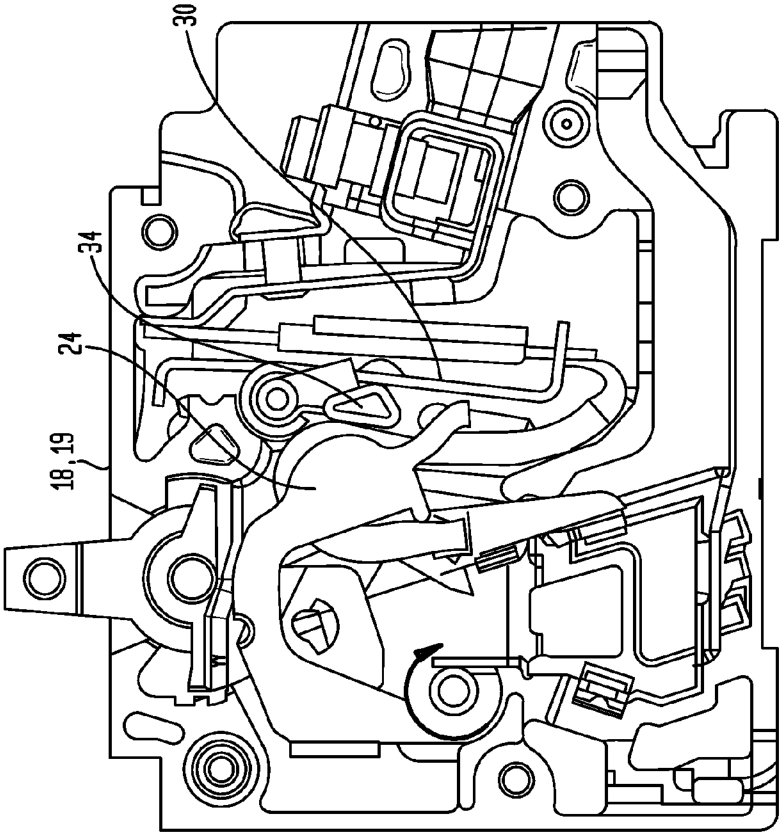

In FIG. 6*e*, the trip bar 34 is used to ensure that the two mechanical poles 18 and 19 have been tripped. The trip bar 34 extends from left module 2 of Fig., through the center module 3, and into the right module 4. Each ends of the trip bar 34 has an actuating feature. This actuating feature interfaces with the armatures 30 in each mechanism pole, 18 and 19. When one mechanical pole, 18 or 19, trips independent of an arc or ground fault, the cradle 24 from that mechanism rotates in a clockwise direction. A profile feature on the cradle 24 interfaces with the actuation feature of the trip bar 34. This forces the trip bar 34 to rotate in a counterclockwise direction. In the other mechanism pole, the trip bar actuation feature begins to rotate counterclockwise and rotates the armature 30 counterclockwise which in turn unlatches the cradle 24 and thus causes the other mechanical pole to trip.

Figure 7:
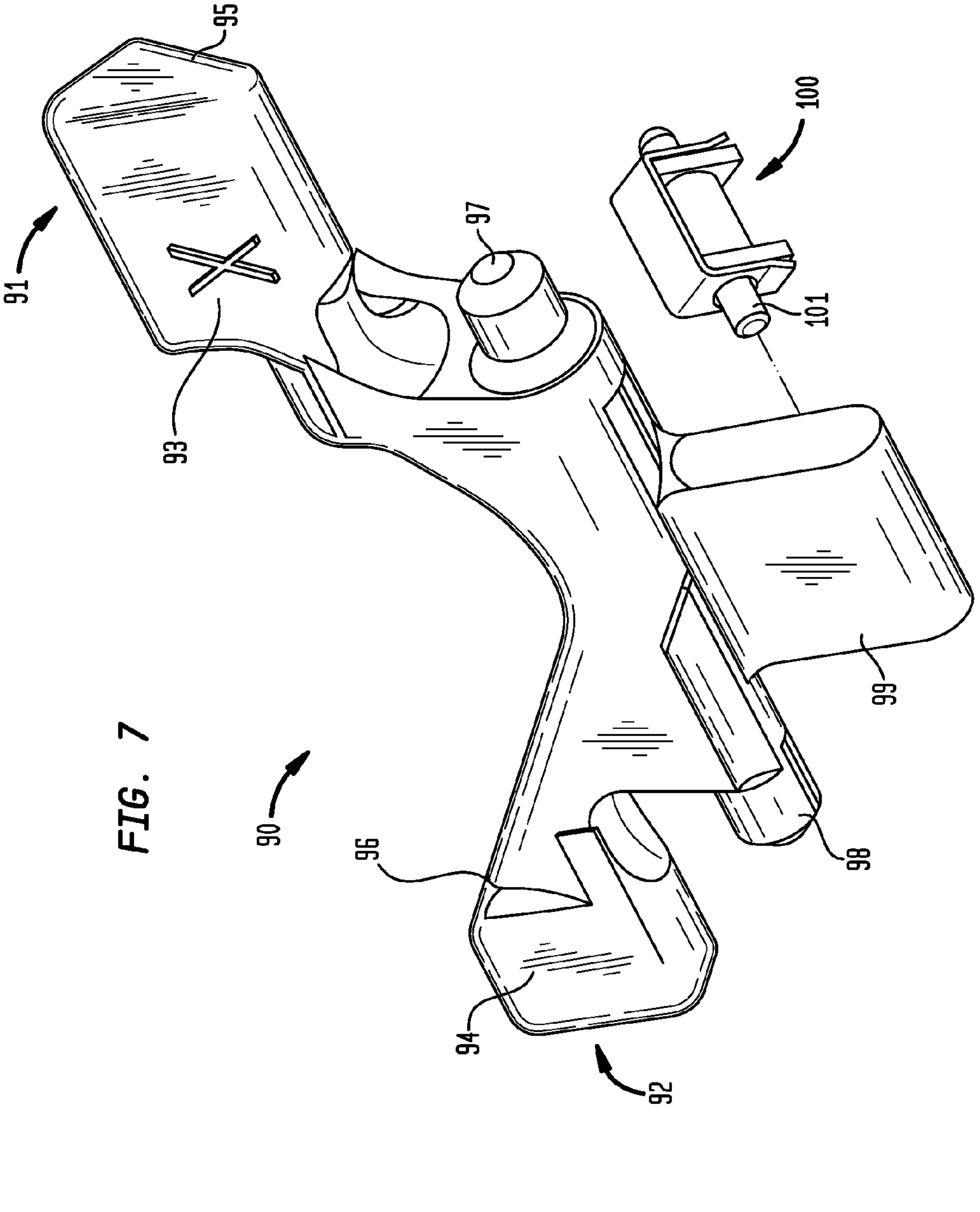
FIG. 7 is a detailed view of an alternate electro-mechanical tripping mechanism for other embodiments of the modular circuit breaker.

Refer now to FIG. 7 for description of an alternate trip bar 90. As shown in FIG. 1, the trip bar 90 extends from left module 2, through the center module 3, and into the right module 4. The trip bar 90 is used to ensure that the two mechanical poles 18 and 19 have been tripped. Each end of the trip bar 90 has an actuating feature 91 and 92. Each actuating feature 91 and 92 has an armature bearing surface 95 and 96 that interfaces with the armatures 30 in each mechanism pole, 18 and 19. When one mechanical pole, 18 or 19, trips independent of an arc or ground fault, the cradle 24 from that mechanism rotates in a clockwise direction. A profile feature on the cradle 24 interfaces with a cradle bearing surface cradle bearing surface 93 and 94 of the actuation feature 91 and 92 of the trip bar 90. This forces the trip bar 90 to rotate in a counterclockwise direction. In the other mechanism pole, the actuation feature 91 and 92 begins to rotate counterclockwise and rotates the armature 30 counterclockwise which in turn unlatches the cradle 24 and thus causing the other mechanical pole to trip. The trip bar 90 further includes a armature bearing surface 99 that provides an interface for the armature 101 of the single wound solenoid 100. The arc fault and ground fault combined detector/interrupter circuit detects an arc fault or a ground fault and activates the solenoid 100 thus thrusting the armature 101 to impact upon the armature bearing surface 99. The armature 101 impacting on the armature bearing surface 99 rotates the trip bar 90 clockwise and thus rotates each actuating feature 91 and 92 on the trip bar 90. The actuating features 91 and 92 would simultaneously rotate the armatures 30 counterclockwise and thus unlatch the cradle 24 in each mechanism pole 18 and 19. The right pivot post 98 is in contact with a bearing feature constructed in an inner surface of a bottom cover of the arc fault and ground fault combined detector/interrupter module 17. The left pivot post 97 is in contact with a bearing surface constructed in an inner surface of a bottom cover of the left thermal-mechanical electrical circuit breaker module 19. The left and right pivot posts 97 and 98 provide the support and alignment to permit the trip bar 90 to rotate the armatures 30 of the left and right thermal-mechanical electrical circuit breaker modules 18 and 19.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A trip bar within an electrical circuit breaker including two thermal-mechanical electrical circuit breaker modules and an arc fault and ground fault combined detector/interrupter circuit module, wherein the trip bar comprises:

a first interface pad to be in contact with a first armature of a first of the two thermal-mechanical electrical circuit breaker modules;

a second interface pad to be in contact with a second armature of a second of the two thermal-mechanical electrical circuit breaker modules;

a first pivot post in contact with an inner surface of a cover of the arc fault and ground fault combined detector/interrupter module;

a second pivot post in contact with an inner surface of a cover of the second thermal-mechanical electrical circuit breaker module; and an armature bearing surface that is impacted with a plunger from the arc fault and ground fault combined detector/interrupter module to rotate the trip bar to cause the two thermal-mechanical electrical circuit breaker modules to trip.

2. The trip bar of claim 1 wherein the arc fault and ground fault combined detector/interrupter module comprises a solenoid which when activated extends the plunger which causes one of the two thermal-mechanical electrical circuit breaker modules to trip such that the one thermal-mechanical electrical circuit breaker module causes rotation of the trip bar causing the other of the two thermal-mechanical electrical circuit breaker modules to trip.

3. The trip bar of claim 2 wherein the trip bar extends from the first thermal-mechanical circuit breaker module, through the arc fault and ground fault combined detector/interrupter circuit module, and into a second of the thermal-mechanical circuit breaker modules, such that the first interface pad is aligned to contact the armature of the first thermal-mechanical electrical circuit breaker module, the second interface pad is aligned to contact the armature of the second thermal-mechanical electrical circuit breaker module and the first pivot post is in contact with the inner surface of the cover of the arc fault and ground fault combined detector/interrupter circuit module, the second pivot post is in contact with the inner surface of the cover of the second thermal-mechanical electrical circuit breaker module, and the plunger from the solenoid can impact the armature bearing surface when the arc fault and ground fault combined detector/interrupter module detects an arc fault or a ground fault.

4. The trip bar of claim 1 wherein the trip bar extends from the first thermal-mechanical circuit breaker module, through the arc fault and ground fault combined detector/interrupter circuit module, and into the second thermal-mechanical circuit breaker module, such that the first interface pad is aligned to contact the armature of the first thermal-mechanical electrical circuit breaker module and the second interface pad is aligned to contact the armature of the second thermal-mechanical electrical circuit breaker module and the first pivot post is in contact with the inner surface of the cover of the arc fault and ground fault combined detector/interrupter circuit module, and the second pivot post is in contact with an inner surface of the cover of the second thermal-mechanical electrical circuit breaker module.

5. A modular circuit breaker package comprising:

a first thermal-mechanical electrical circuit breaker enclosure into which a first breaker mechanism pole is mounted having a first side cover for receiving the breaker mechanism pole and a second side cover for protecting the first breaker mechanism pole;

a second thermal-mechanical electrical circuit breaker enclosure into which a second breaker mechanism pole is mounted having a first side cover for receiving the breaker mechanism pole and a second side cover for protecting the second breaker mechanism pole; and an arc fault and ground fault detector/interrupter circuit enclosure into which an arc fault and ground fault combined detector/interrupter circuit is mounted having a first side cover for receiving the arc fault and ground fault combined detector/interrupter circuit and a second side cover for protecting the arc fault and ground fault combined detector/interrupter circuit;

wherein the second side cover of the first thermal-mechanical electrical circuit breaker enclosure has an opening to receive a first interface pad of a trip bar to align the first interface pad with an armature of the first breaker mechanism pole;

wherein the first side cover of the second thermal-mechanical electrical circuit breaker enclosure has a bearing surface to receive a second pivot post of the trip bar to secure the trip bar while allowing the trip bar to rotate;

wherein the first and second side covers of the arc fault and ground fault detector/interrupter enclosure has an opening through which the trip bar passes;

wherein the second side cover of the are fault and ground fault detector/interrupter enclosure has a bearing surface to receive a first pivot post of the trip bar for securing the trip bar and allowing the trip bar to rotate; and wherein the first side cover of the second thermal-mechanical electrical circuit breaker enclosure has an opening to receive a second interface pad of the trip bar to align the second interface pad with an armature of the second breaker mechanism pole.

6. The modular circuit breaker package of claim 5 wherein the first and second thermal-mechanical electrical circuit breaker enclosures are aligned and in contact with the arc fault and ground fault detector/interrupter circuit enclosure situated between the first and second thermal-mechanical electrical circuit breaker enclosures.

7. The modular circuit breaker package of claim 6 wherein if the first breaker mechanism pole or the second breaker mechanism pole or the arc fault and ground fault combined detector/interrupter circuit fail, it is replaceable with the remaining of the first breaker mechanism pole or the second breaker mechanism pole or the arc fault and ground fault combined detector/interrupter circuit module that did not fail being reusable.

8. A modular circuit breaker comprising:

two thermal-mechanical electrical circuit breaker modules;

an arc fault and ground fault combined detector/interrupter module placed in contact with and secured between the thermal-mechanical electrical circuit breaker modules; and a trip bar to rotate and trip one of said two thermal-mechanical electrical circuit breaker modules during a fault that causes the other of the two thermal-mechanical electrical circuit breaker module to trip;

wherein the two thermal-mechanical electrical circuit breaker modules each include an outer top cover and an inner bottom cover such that breaker mechanism poles for the two thermal-mechanical electrical circuit breaker modules are each affixed to the inner bottom cover and the outer top cover is secured to the inner bottom cover with fasteners;

wherein the arc fault and ground fault combined detector/interrupter module includes an outer top cover and an inner bottom cover such that the outer top cover and the inner bottom cover provide supporting features for the arc fault and ground fault combined detector/interrupter electronic module;

a first interface pad to be in contact with a first armature of a first of the two thermal-mechanical electrical circuit breaker modules;

a second interface pad to be in contact with a second armature of a second of the two thermal-mechanical electrical circuit breaker modules;

a first pivot post in contact with an inner surface of a cover of the arc fault and ground fault combined detector/interrupter module; and a second pivot post in contact with an inner surface of a cover of the second thermal-mechanical electrical circuit breaker module, and wherein the arc fault and ground fault combined detector/interrupter electronic module detects the existence of arc faults and ground faults and generates electronic signals to cause the trip bar to rotate for tripping the breaker mechanism poles of the two thermal-mechanical electrical circuit breaker modules.

9. The modular circuit breaker of claim 8 wherein the trip bar further comprising an armature bearing surface that is impacted with a plunger from a solenoid of the arc fault and ground fault combined detector/interrupter module to rotate the trip bar to cause the two thermal-mechanical electrical circuit breaker modules to trip.

10. The modular circuit breaker of claim 9 wherein the trip bar extends from the first thermal-mechanical circuit breaker module, through the arc fault and ground fault combined detector/interrupter circuit module, and into a second of the thermal-mechanical circuit breaker modules, such that the first interface pad is aligned to contact the armature of the first thermal-mechanical electrical circuit breaker module, the second interface pad is aligned to contact the armature of the second thermal-mechanical electrical circuit breaker module and the first pivot post is in contact with the inner surface of the cover of the arc fault and ground fault combined detector/interrupter circuit module, the second pivot post is in contact with the inner surface of the cover of the second thermal-mechanical electrical circuit breaker module, and the plunger from the solenoid can impact the armature bearing surface when the arc fault and ground fault combined detector/interrupter module detects an arc fault or a ground fault.

11. The modular circuit breaker of claim 8 wherein the trip bar extends from the first thermal-mechanical circuit breaker module, through the arc fault and ground fault combined detector/interrupter circuit module, and into the second thermal-mechanical circuit breaker module, such that the first interface pad is aligned to contact the armature of the first thermal-mechanical electrical circuit breaker module and the second interface pad is aligned to contact the armature of the second thermal-mechanical electrical circuit breaker module and the first pivot post is in contact with the inner surface of the cover of the arc fault and ground fault combined detector/interrupter circuit module, and the second pivot post is in contact with an inner surface of the cover of the second thermal-mechanical electrical circuit breaker module.

* * * * *